United States Patent [19]
Watson, Jr. et al.

[11] Patent Number: 5,636,695
[45] Date of Patent: Jun. 10, 1997

[54] GRIPPING DEVICE FOR A HORSESHOE

[76] Inventors: Curtis G. Watson, Jr., 30085 Bock, Garden City, Mich. 48135; Andrew G. Mannarino, 3515 Dean, Howell, Mich. 48843

[21] Appl. No.: 408,208

[22] Filed: Mar. 22, 1995

[51] Int. Cl.$^6$ ............................................. A01L 7/08
[52] U.S. Cl. ................................................. 168/30
[58] Field of Search .................... 168/11, 30, 31, 168/34

[56] References Cited

U.S. PATENT DOCUMENTS

| | | | |
|---|---|---|---|
| 303,650 | 8/1884 | Lewis | 168/30 |
| 903,830 | 11/1908 | Berg | 168/30 |
| 981,632 | 1/1911 | Fritz | 168/30 |
| 4,564,071 | 1/1986 | Lee | 168/19 |
| 4,690,222 | 9/1987 | Cameron | 168/4 |
| 4,721,165 | 1/1988 | Ovnicek | 168/24 |
| 4,888,918 | 12/1989 | Anderson | 168/13 |
| 5,029,648 | 7/1991 | Stephens | 168/12 |
| 5,172,766 | 12/1992 | Adkins | 168/14 |
| 5,186,259 | 2/1993 | Teichman | 168/24 |
| 5,230,384 | 7/1993 | Nebel et al. | 168/11 |
| 5,253,715 | 10/1993 | Ovnicek | 168/14 |
| 5,287,931 | 2/1994 | Eriksson | 168/24 |
| 5,343,957 | 9/1994 | Chapman | 168/11 |
| 5,348,098 | 9/1994 | Di Giulio | 168/12 |

*Primary Examiner*—Robert P. Swiatek
*Attorney, Agent, or Firm*—Weintraub DuRoss & Brady

[57] ABSTRACT

A gripping device for horse's hooves. The novel device, in general, prevents the horse's hoof from winging in or paddling out in order that the hoof travels in a straight line, and, in addition, spreads shock evenly upon striking the contacting surface and taking pressure off the wall of the hoof. The gripping device has a flat top surface which faces towards a horse's hoof and a bottom surface opposite the top surface, the bottom surface having a raised portion for improved gripping, the device being positioned centrally with respect to the horse's hoof.

14 Claims, 3 Drawing Sheets

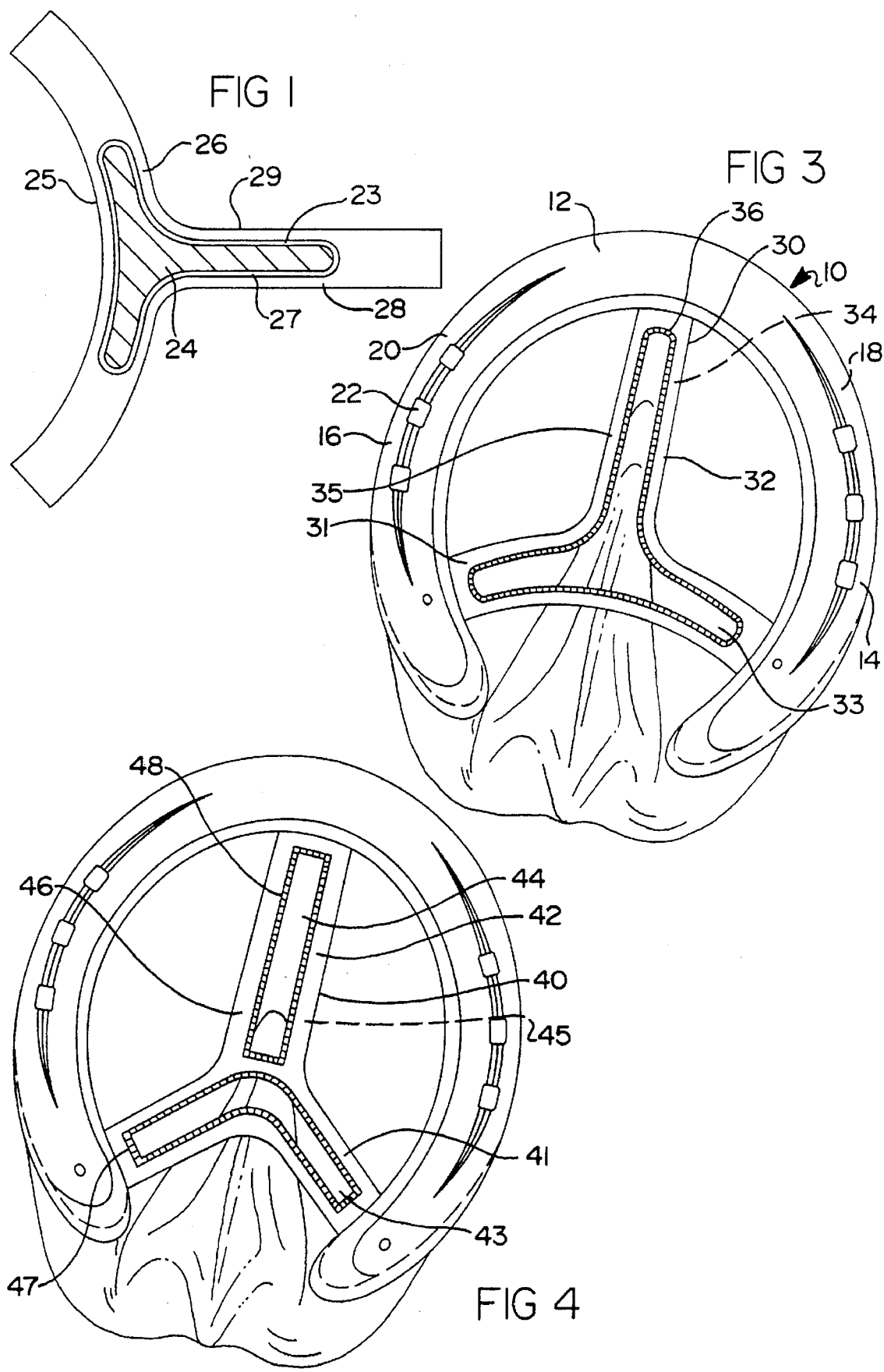

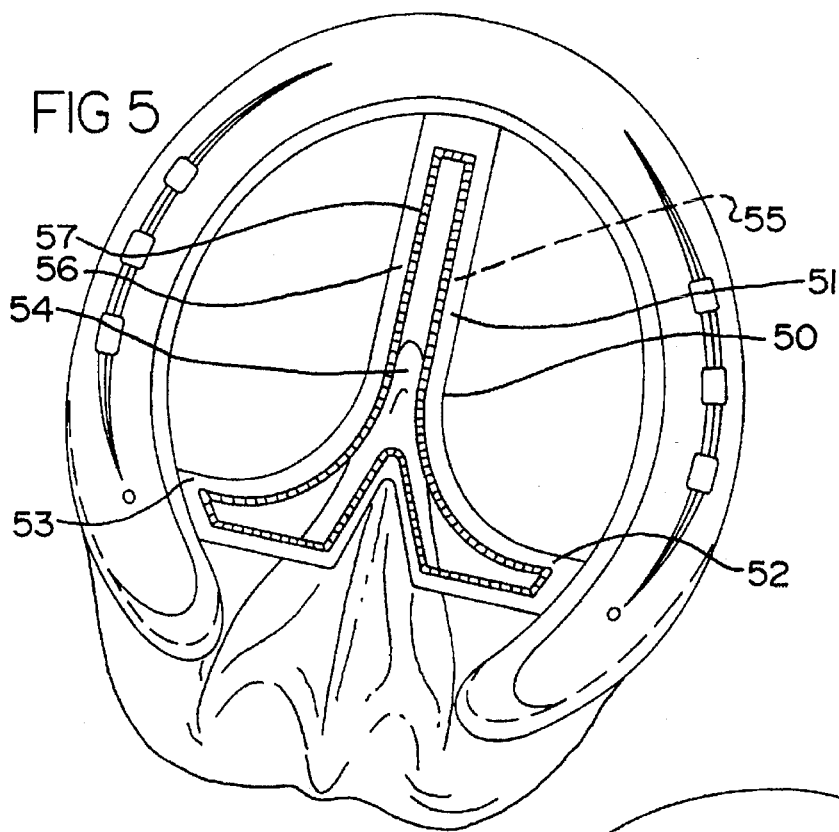
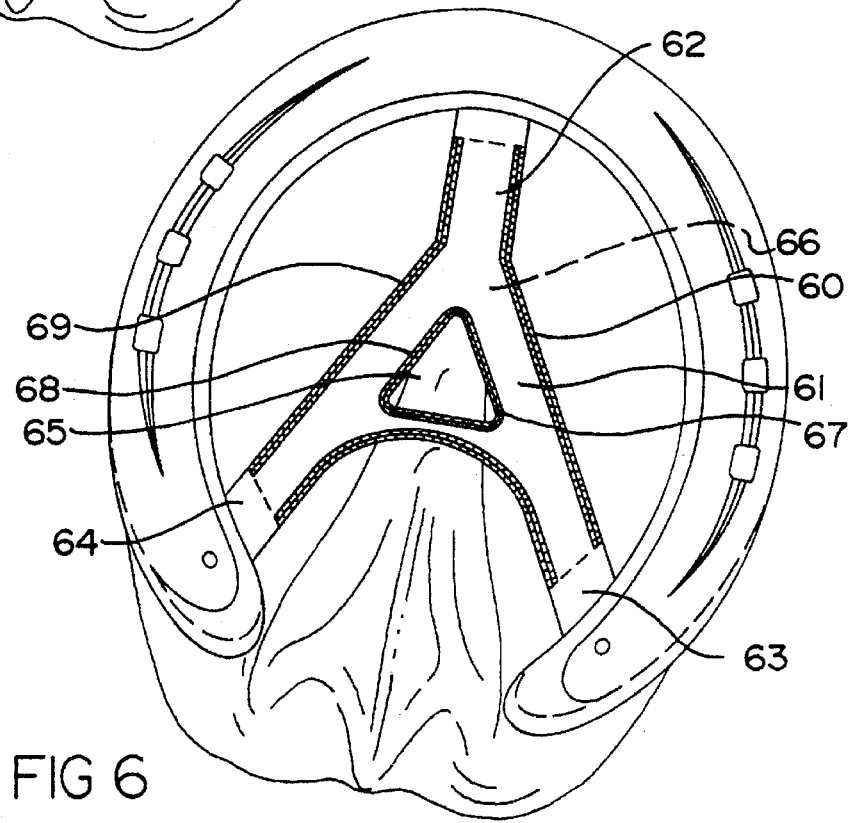

GRIPPING DEVICE FOR A HORSESHOE

FIELD OF THE INVENTION

This invention relates to a gripping device for a horseshoe. In particular, the invention relates to a gripping device for a horseshoe to provide improved grip to the surface on which the horse's hoof contacts. More specifically, the novel gripping device is, in general, designed to prevent the horse's hoof from winging in or paddling out in order that the hoof travels in a straight line, and to spread shock evenly taking the pressure off the wall of the hoof.

BACKGROUND OF THE INVENTION

Horseshoes come in a variety of size and shapes depending on the type of horse and the activity for which the horse is to be engaged. Generally, horseshoes are U-shaped and conform to the circumference of the hoof with two branches emanating from the toe area and projecting beyond the heel. Some of the early horseshoes were made out of iron and were forged to fit the varying sizes and shapes of the horses' hooves. A shoe is then nailed onto each hoof. Every three to five weeks due to the growth of the horse hoof, the shoe is removed and the foot trimmed. The shoe can be reused or reset each time until it is worn out at which time it is replaced with a new shoe. Although, iron or metal horseshoes offer protection to the horse's foot, they offer little or no absorption of shock and concussion when the horse moves, especially when carrying a rider. Furthermore, metal horseshoes wear smooth and provide little traction on many surfaces.

In recent years, horseshoes of various plastics and elastomers have been tried. Although, they increase the absorption of shock and concussion, they failed to offer proper protection to the horse's hoof because of their lack of stiffness, shapeability, and durability. Typically, the better the particular material performed as a shock absorber, the worse its wear characteristics. Further, these shoes have typically worn smooth and as a result traction or grip is lost.

There have been attempts to incorporate horseshoe pads as an integral part of the metal horseshoe. Generally, these are plastic or leather pads, which are attached to the top part of the horseshoe. While, having the pad between the horse's hoof and the metal horseshoe provided some absorption of the shock and concussion forces, in general, such a pad would weaken the overall stability of the shoe.

It is, therefore, desirable to have a horseshoe with a gripping device which improves the grip between a horse's hoof and the contacting surface while at the same time functioning to prevent the horse's hoof from sliding on the contacting surface, to prevent the horse's hoof from winging in or paddling out in order that the hoof travels in a straight line, and spreading shock evenly taking the pressure off the wall of the hoof.

SUMMARY OF THE INVENTION

In accordance with the present invention, there is provided a gripping device for horses which improves the grip between a horse's hoof and the contacting surface.

Further in accordance with present invention, an improved gripping device for horses' hooves is provided which, in general, prevents the horse's hoof from winging in or paddling out in order that the hoof travels in a straight line, and spreads shock evenly upon striking the contacting surface and taking pressure off the wall of the hoof.

Still further, in accordance with the present invention, there is provided a gripping device for a horseshoe which keeps the shoe from spreading and keeps the horse's heels from contracting.

Still further in accordance with the present invention, there is provided a gripping device for use in conjunction with or as an integral part of a horseshoe for improving the grip between a horse's hoof and the contacting surface, the device having a flat top surface which faces towards a horse's hoof and a bottom surface opposite the top surface, the bottom surface having a raised portion for improved gripping, the device being positioned centrally with respect to the horse's hoof.

Still further in accordance with the present invention, there is provided a gripping device for use in conjunction with or an integral part of a horseshoe for improving the grip between a horse's hoof and the contacting surface, the device having various specially designed shapes.

These and other aspects of the present invention will become clear to those skilled in the art from the reading and understanding of the specification.

BRIEF DESCRIPTION OF THE DRAWINGS

The invention will be further described in connection with the attached drawing figures showing preferred embodiments of the invention including specific parts and arrangements of parts. It is intended that the drawings included as a part of this specification be illustrative of the preferred embodiment of the invention and should in no way be considered as a limitation on the scope of the invention.

FIG. 1 is a bottom view of the gripping device in accordance with the present invention.

FIG. 2 is a side view of the gripping device according to the present invention.

FIG. 3 is a bottom view of a horseshoe showing one embodiment of a gripping device according to the present invention.

FIG. 4 is a bottom view of a horseshoe showing a second embodiment of a gripping device according to the present invention.

FIG. 5 is a bottom view of a horseshoe showing a third embodiment of a gripping device according to the present invention.

FIG. 6 is a bottom view of a horseshoe showing a fourth embodiment of a gripping device according to the present invention.

DETAILED DESCRIPTION OF THE INVENTION

Figure 7:
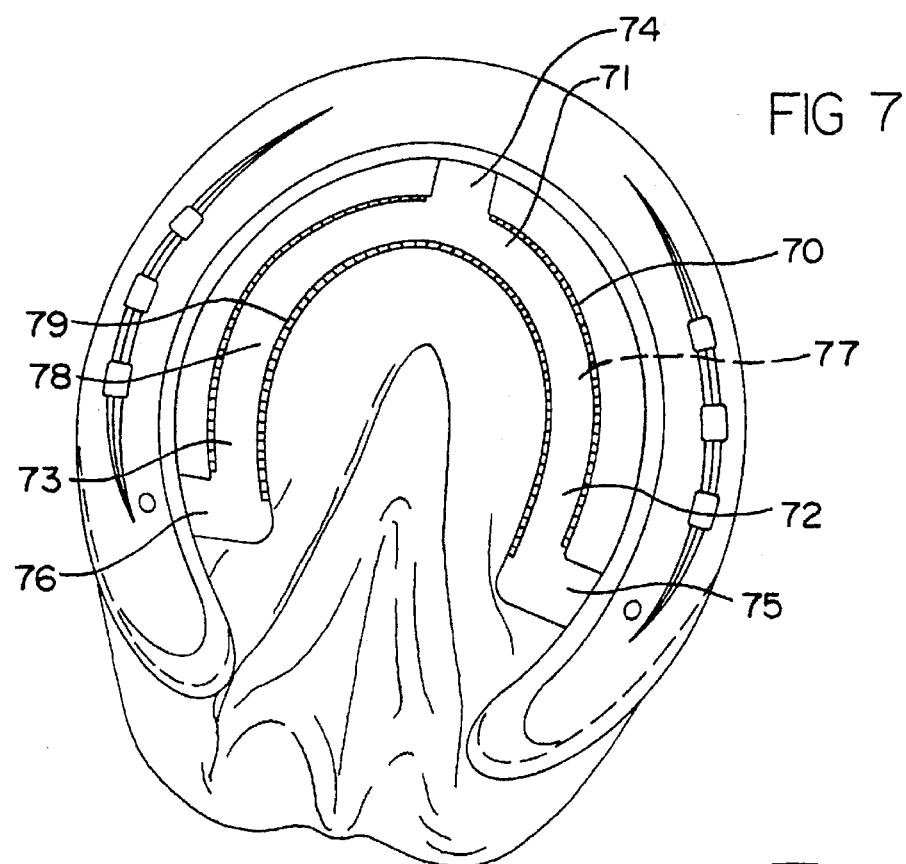
FIG. 7 is a bottom view of a horseshoe showing a fifth embodiment of a gripping device according to the present invention.

This invention is directed to a gripping device for a horseshoe for improving the grip between a horse's hoof and the conducting surface, resulting in better traction for the horse. The gripping device of the present invention further prevents the hoof from winging in or paddling out in order that the hoof travels in a straight line, and, in addition, spreads shock evenly taking the pressure off the wall of the hoof. The gripping device also keeps the horseshoe from spreading and keeps the horse's heels from contracting. The gripping device will be described by referring to the drawings.

The gripping device is generally shown in FIGS. 1 and 2. The gripping device shown in FIG. 1 and generally designated as 25 comprises a flat top surface 23 that faces towards the horse's hoof and a bottom surface 28 opposite the top surface, the bottom surface has a raised portion 27 which provides the gripping surface when contacting the ground or surface on which the horse is being ridden. The gripping device 25 further comprises a central arcuate portion 26 extending to a generally rectangular shape portion 29, the generally rectangular portion being attached near the center of the arcuate portion and positioned perpendicular to the arcuate portion. The gripping device 25 further has an opening 24 having a curved portion and a rectangular portion, the curved portion being located in the arcuate portion 26 of the device and a rectangular portion extending into the rectangular portion 29 of the device 25, wherein the opening 24 generally has a T-shape. The raised portion 27 surrounds and forms the border of the T-shaped opening. The gripping device 25 is designed such that it is positioned centrally with respect to the horse's hoof and may be attached to the horse's hoof by any suitable means. FIG. 2 showing a side view of gripping device 25, shows the raised section 27 extending from the bottom surface 28.

FIGS. 3–8 show the gripping device according to the present invention in combination with a horseshoe. The horseshoe 10 is a generally U-shaped article having a central arcuate toe portion 12, an arcuate right leg portion 14, and an arcuate left leg portion 16. The shoe 10 has a ground facing, substantially planar side 18 and a top hoof wall or sole facing side 20 with a plurality of nail apertures 22 for attaching the shoe 10 to the wall of the hoof. The horseshoe may be made of any material suitable for horseshoes, such as steel, aluminum, plastic, or composite materials thereof. The plastic may be any number of durable engineering plastics having good wear and strength properties, e.g., polyesters, polyimides, polycarbonates, polyaramides, nylons, various polymer alloys of these materials and the like. The composite material may be polymer/metal alloys and/or composites and the like.

As shown in FIGS. 3–8, the gripping device of the present invention has a flat top surface which faces towards the horse's hoof and a bottom surface opposite the top surface. The bottom surface has a raised portion for improved gripping. The gripping device is positioned between the horse's hoof and the horseshoe. The gripping device is attached by any suitable means to the horse's hoof. Such suitable means for attaching the gripping device include nailing the gripping device to the hoof or horseshoe, using tabs to attach the gripping device to the horseshoe, using other forms of fasteners, and the like.

In one embodiment of the present invention, the horseshoe may further include a wedge shaped pad having a wedge shaped frog insert which is integrally-formed with or securely attached to the pad not shown in the figures. The frog insert may function to support the coffin bone of the horse's hoof when the hoof is under load. Besides, supporting the coffin bone, the insert also provides support for the rest of the subsolar surface. It also provides stimulation of the vascular system and hence is an aid to blood circulation. When the horseshoe includes a frog insert, the gripping device lays atop the frog insert pressing on the frog with every step helping to stimulate blood circulation.

The gripping device of the present invention may be made from any suitable material such as steel, aluminum, other metals, plastic, or composite materials. Such as those previously discussed. The gripping device may be used in various types of horseshoes. For example, the gripping device may be used with keg or cowboy shoes, such as plain horseshoes, heeled horseshoes with heel calks, or heeled and toed horseshoes with heel and toe calks. The gripping device may further be used with pony and mule shoes such as plain mule shoes, heeled mule shoes, plain pony shoes, plain shoes, or block heels toed shoes. The gripping device may also be used with aluminum racing plates for hind feet. Examples of these types of horseshoes include right sticker or mud calk shoes, left sticker or mud calk shoes, block heel shoes, plain heel shoes, left block and sticker shoes, right block and sticker shoes, level grip or outside rim shoes, and queens plate shoes. Moreover, the gripping device may be a separate unit or the device may be made an integral part of shoe, e.g., by molding or casting the shoe and the gripping device in the same mold. Alternatively, the gripping device may be made separately and be formed from a different material than the material of the shoe.

One embodiment of the present invention is shown in FIG. 3. The gripping device 30 comprises a central arcuate portion 31 and a rectangular shaped portion 32, the rectangular portion being attached near the center of the arcuate portion and positioned perpendicular to the arcuate portion. The gripping device has an opening 33 having a curved portion and a rectangular portion, the curved portion being located in the arcuate portion 31 of the device and the rectangular portion extending into the rectangular portion 32 of the device, and the opening having a general T-shape. The gripping device further has a flat top surface 34 which faces towards a horse's hoof and a bottom surface 35 opposite the top surface, the bottom surface having a raised portion 36 which surrounds the T-shaped opening. The gripping device is positioned centrally with respect to the horse's hoof and attached to the horse's hoof by any suitable means.

In a second embodiment of the present invention of FIG. 4, the gripping device 40 comprises a central arcuate portion 41 and a rectangular shaped portion 42, the rectangular portion being attached near the center of the arcuate portion and positioned perpendicular to the arcuate portion. The gripping device has an arcuate shaped opening 43 located in the arcuate portion 41 of the device and a rectangular shaped opening 44 located in the rectangular portion 42 of the device. The gripping device further has a flat top surface 45 which faces towards a horse's hoof and a bottom surface 46 opposite the top surface, the bottom surface having a raised portion 47 surrounding the arcuate shaped opening 43 and a raised portion 48 surrounding the rectangular shaped opening 44. The gripping device is positioned centrally with respect to the horse's hoof and attached to the horse's hoof by any suitable means.

In another embodiment of the present invention as shown in FIG. 5, the gripping 50 device comprises a rectangular shaped portion 51 and two adjoining leg portions 52, 53 which extend in opposite directions from the rectangular portion and are perpendicular to the rectangular portion, the device having a general Y-shape. The gripping device has an opening 54 in the device, the opening having a straight portion and two adjoining leg portions extending in opposite directions from the straight portion, the straight portion being located in the rectangular portion 51 of the device and the leg portions extending into the leg portions 52, 53 of the device, and the opening having a general Y-shape. The gripping device further has a flat top surface 55 which faces towards a horse's hoof and a bottom surface 56 opposite the top surface, the bottom surface having a raised portion 57 which surrounds the Y-shaped opening 54. The gripping device is positioned centrally with respect to the horse's hoof and attached to the horse's hoof by any suitable means.

In another embodiment of the present invention as shown in FIG. 6, the gripping device 60 has a central triangular portion 61 and three rectangular portions 62, 63, 64 extending from the three ends of the triangular portion. The gripping device further has a triangular shaped opening 65 located in the triangular portion 61. The gripping device further has a flat top surface 66 which faces towards a horse's hoof and a bottom surface 67 opposite the top surface, the bottom surface having a raised portion 69 around the perimeter of the device and a raised portion 68 which surrounds the triangular shaped opening 65. The gripping device is attached to the horseshoe on the side facing the horse's hoof by any suitable means.

In another embodiment of the present invention as shown in FIG. 7, the gripping device 70 has a central arcuate portion 71, an arcuate right leg portion 72, an arcuate left leg portion 73, and three rectangular portions 74, 75, 76, one rectangular portion 74 located at the center of the central arcuate portion 71 extending in a direction opposite the leg portions, and the other rectangular portions 75, 76 located at the ends of the leg portions perpendicular to the leg portions and extending in a direction opposite the opposite leg portion. The gripping device has a flat top surface 77 which faces towards a horse's hoof and a bottom surface 78 opposite the top surface, the bottom surface having a raised portion 79. The raised portion has a central arcuate portion, an arcuate right leg portion, and an arcuate left leg portion. The gripping device is positioned centrally with respect to the horse's hoof and attached to the horse's hoof by any suitable means.

Figure 8:
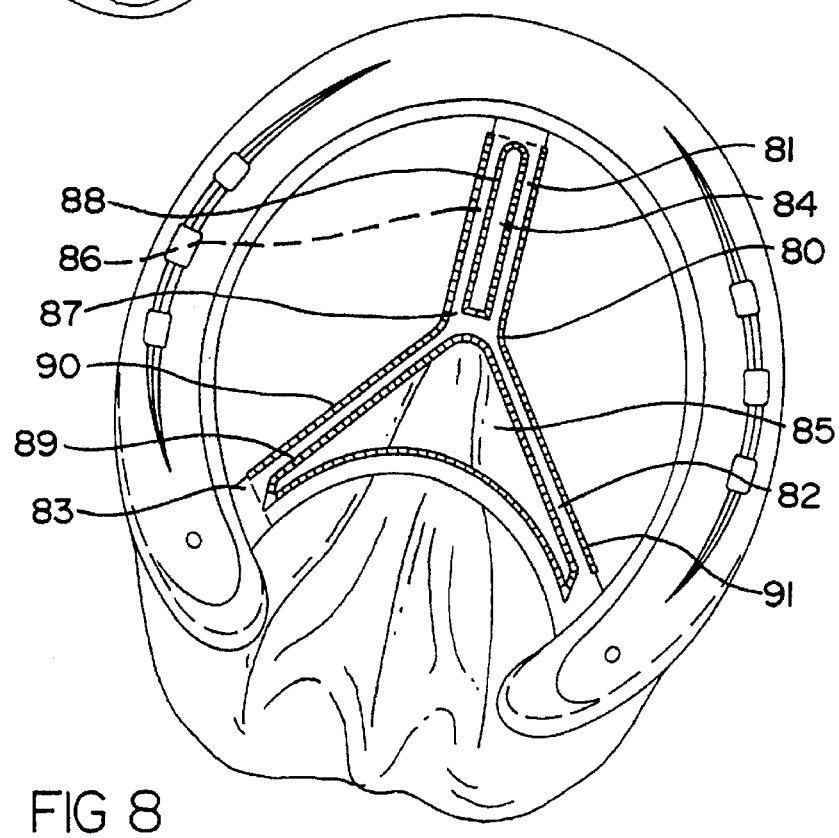
FIG. 8 is a bottom view of a horseshoe showing a sixth embodiment of a gripping device according to the present invention.

In another embodiment of the present invention as shown in FIG. 8, the gripping device 80 comprises a rectangular shaped portion 81 having two long sides and two shorter sides, and two adjoining leg portions 82, 83 which extend in opposite directions from the rectangular portion 81 and are angularly disposed with respect to the rectangular portion, the device having a general, as shown. The gripping device has a rectangular shaped opening 84 located in the rectangular portion 81 of the device and a triangular shaped opening 85 located in the leg portions 82, 83 of the device. The gripping device further has a flat top surface 86 which faces towards a horse's hoof and a bottom surface 87 opposite the top surface, the bottom surface having a raised portion 88 surrounding the rectangular shaped opening 84, a raised portion 89 surrounding the triangular shaped opening 85, and raised portions 90, 91 along the long sides of the rectangular portion and extending onto the adjoining leg portions. The gripping device is positioned centrally with respect to the horse's hoof and attached to the horse's hoof by any suitable means.

The gripping device of the present invention improves the traction between the horse's hoof and the ground. The gripping device also prevents the horse's hoof from sliding on the contacting surface. The gripping device further prevents the horse's hoof from winging in or paddling out causing the horse to travel in a straight line. The design of the gripping device spreads the shock evenly and takes pressure off the wall of the horse's hoof. In addition, the gripping device prevents the horseshoe from spreading and keeps the horse's heel from contracting. Further, the gripping device is safe to use because no portion of the device extends to the bottom of the horseshoe.

Although various exemplary embodiments of the invention have been disclosed for illustrative purposes, it is understood that variations and modifications can be made by one skilled in the art without departing from the spirit or scope of the invention.

What is claimed is:

1. A gripping device for use in conjunction with a horseshoe for improving the traction between a horse's hoof and a contacting surface, said device having;
   (a) a flat top surface adapted to face toward a horse's hoof, and
   (b) a bottom surface opposite the top surface, said bottom surface having
      (1) at least one raised portion for improved gripping, and
      (2) at least a portion of the at last one raised portion adapted to overlie the frog of a horse's hoof when attached to a horse's hoof, the device comprising at least two portions and at least one opening wherein the at least one raised portion surrounds the at least one opening, said device being positionable centrally with respect to the horse's hoof.

2. The gripping device of claim 1, said device further comprising:
   a central arcuate portion and a straight rectangular shape portion, said straight rectangular portion being attached near the center of the arcuate portion and angularly disposed with respect to the arcuate portion; and
   the at least on opening in the device having a curved portion and a rectangular portion, the curved portion of the opening being located in the arcuate portion of the device and the rectangular portion of the opening extending into the straight portion of the device, said opening having a general T-shape.

3. The gripping device of claim 1, said device further comprising:
   a central arcuate portion and a rectangular shaped portion, said rectangular portion being attached near the center of the arcuate portion and angularly disposed with respect to the arcuate portion;
   an arcuate shaped opening located in the arcuate portion of the device;
   a rectangular shaped opening located in the rectangular portion of the device; and
   at least a first and second raised portion on the bottom surface, wherein the first raised portion surrounds the arcuate shaped opening and the second raised portion surrounds the rectangular shaped opening.

4. The gripping device of claim 1, said device further comprising:
   a rectangular shaped portion and two adjoining leg portions that extend in opposite directions from the rectangular portion and are angularly disposed with respect to the rectangular portion, said device having a general Y-shape; and
   the at least one opening having a straight portion and two adjoining leg portions extending in opposite directions from the straight, portion, said straight portion being located in the rectangular portion of the device and the leg portions extending into the leg portions of the device, said least one opening having a general Y-shape.

5. The gripping device of claim 1, said device further comprising:
   a central triangular portion comprising a first, a second and third end; and
   a first, a second and a third rectangular portion,
   wherein the first rectangular portion extends from the first end of the triangular portion, the second rectangular portion extends from the second end of the triangular portion, and the third rectangular portion extends from the third end of the triangular portion;

the at least one opening being triangular shaped and located in the triangular portion; and at least a first and a second raised portion on the bottom surface, wherein the first, raised portion surrounds the perimeter of said device and the second raised portion surrounds the triangular shaped opening.

6. The gripping device of claim 1, said device further comprising:

a central arcuate portion, an arcuate right leg portion, an arcuate left leg portion, and at least a first, a second, and a third rectangular portion, the first rectangular portion being located at the center of the arcuate portion extending in a direction opposite the leg portions, the second rectangular portion being located at the end of the right leg portion perpendicular to the right leg portion and extending in a direction opposite the right leg portion, and the third rectangular portion being located at the end of the left leg portion perpendicular to the left leg portion and extending in a direction opposite the left leg portion; and the at least one raised portion on the bottom surface having a central arcuate portion, an arcuate right leg portion, and an arcuate left leg portion.

7. The gripping device of claim 1, said device further comprising:

a rectangular shaped portion having a first long side, a second long side opposite the first long side, and two shorter sides, and two adjoining leg portions that extend in opposite directions from the rectangular portion and are angularly disposed with respect to the rectangular portion, said device having e general Y-Shape;

a rectangular shaped opening located in the rectangular portion of the device;

a triangular shaped opening located in the leg portions of the device; and at least a first, a second, a third, and a fourth raised portion on the bottom surface wherein the first raised portion surrounds the rectangular shaped opening, the second raised portion surrounds the triangular shaped opening, the third raised portion is positioned along the first of the long sides of the rectangular portion and extends onto the adjoining leg portion, and the fourth raised portion is positioned along the second of the long sides of the rectangular portion and extends onto the adjoining leg portion.

8. A horseshoe having improved traction comprising a gripping device integrally incorporated in said horseshoe, herein said horseshoe is generally U-shaped having a central arcuate toe portion, an arcuate right leg portion, and an arcuate left leg portion, said horseshoe further having upper and lower substantially planar surfaces, and said gripping device having;

(a) a flat top surface adapted to face toward a horse's hoof, and (b) a bottom surface opposite the top surface, said bottom surface having (1) at least one raised portion for improved gripping, and (2) at least a portion of the at least one raised portion adapted to overlie the frog of the horse's hoof when the shoe is attached to the horse's hoof, the device comprising at last two portions and at least one opening wherein the at least one raised portion surrounds the at least one opening, said device being positionable centrally with respect to the horse's hoof.

9. The horseshoe of claim 8, the gripping device further comprising:

a central arcuate portion and a straight rectangular shaped portion, said straight rectangular portion being attached near the center of the arcuate portion and angularly disposed with respect to the arcuate portion; and the at least one opening in the device having a curved portion and a rectangular portion, the curved portion of the at least one opening being located in the arcuate portion of the device and the rectangular portion of the at least one opening extending into the straight portion of the device, said a leas one opening having a general T-shape.

10. The horseshoe of claim 8, the gripping device further comprising:

a central arcuate portion and a rectangular shaped portion, said rectangular portion being attached near the center of the arcuate portion and angularly disposed with respect to the arcuate portion;

an arcuate shaped opening located in the arcuate portion of the device;

a rectangular shaped opening located in the rectangular portion of the device: and at least a first and a second raised portion on the bottom surface, wherein he first raised portion surrounds the arcuate shaped opening and the second raised portion surrounds the rectangular shaped opening.

11. The horseshoe of claim 8, the gripping device further comprising:

a rectangular shaped portion and two adjoining leg portions that extend in opposite directions from the rectangular portion and are angularly disposed with respect to the rectangular portion, said device having a general Y-shape; and the at least one opening having a straight portion and two adjoining leg portions extending in opposite directions from the straight portion, said straight portion being located in the rectangular portion of the device and the leg portions extending into the leg portions of the device, said opening having a general Y-shape.

12. The horseshoe of claim 8, the gripping device further comprising:

a central triangular portion comprising a first, a second, and a third end; and a first, a second, and a third rectangular portion, wherein the first rectangular portion extends from the first end of the triangular portion, the second rectangular portion extends from the second end of the triangular portion, and the third rectangular portion extends from the third end of the triangular portion;

a triangular shaped opening located in the triangular portion; and at least a first and a second raised portion on the bottom surface, wherein the first raised portion surrounds the perimeter of said device and the second raised portion surrounds the triangular shaped opening.

13. The horseshoe of claim 8, the gripping device further comprising:

a central arcuate portion, an arcuate right leg portion, an arcuate left leg portion, and at least a first, a second, and a third rectangular portion, the first rectangular portion being located at the center of the arcuate portion extending in a direction opposite the leg portions, the second rectangular portion being located at the end of the right leg portion perpendicular to the leg portion and extending in a direction opposite the right leg portion, and a third rectangular portion being located at the end of the left leg portion perpendicular to the left leg portion and extending in a direction opposite the left leg portion; and and at least one raised portion on the bottom surface having a central arcuate portion, an arcuate right leg portion, and an arcuate left leg portion.

14. The horseshoe of claim 8, the gripping device further comprising:

a rectangular shaped portion having a first long side, a second long side opposite the first long side, and two shorter sides, and two adjoining leg portions that extend in opposite directions from the rectangular portion and are angularly disposed with respect to the rectangular portion, said device having a general Y-shape;

a rectangular shaped opening located in the rectangular portion of the device;

a triangular shaped opening located in the leg portions of the device; and at least a first, a second, a third, and a fourth raised portion on the bottom surface, wherein the first raised portion surrounds the rectangular shaped opening, the second raised portion surrounds the triangular shaped opening, the third raised portion is positioned along the first of the long sides of the rectangular portion and extends onto the adjoining leg portion, and the fourth raised portion is positioned along the second long side of the rectangular portion and extends onto the adjoining leg portion.

* * * * *